United States Patent
Chaban

(10) Patent No.: US 11,203,186 B2
(45) Date of Patent: Dec. 21, 2021

(54) MULTI-LAYERED STRUCTURE FOR THE PRODUCTION OF A FLOOR COVERING WITH SOUND-INSULATING AND INDENTATION-RESISTANT PROPERTIES

(71) Applicant: Gerflor, Villeurbanne (FR)

(72) Inventor: Nicolas Chaban, Saint Restitut (FR)

(73) Assignee: Gerflor, Villeurbanne (FR)

( * ) Notice: Subject to any disclaimer, the term of this patent is extended or adjusted under 35 U.S.C. 154(b) by 0 days.

(21) Appl. No.: 16/941,965

(22) Filed: Jul. 29, 2020

(65) Prior Publication Data

US 2021/0078306 A1    Mar. 18, 2021

(30) Foreign Application Priority Data

Sep. 12, 2019  (FR) ....................... 1910043

(51) Int. Cl.
 *B32B 27/06* (2006.01)
 *B32B 5/18* (2006.01)
 (Continued)

(52) U.S. Cl.
 CPC .............. *B32B 27/065* (2013.01); *B32B 5/18* (2013.01); *B32B 27/08* (2013.01); *B32B 27/22* (2013.01);
 (Continued)

(58) Field of Classification Search
 CPC ......... B32B 5/18; B32B 27/065; B32B 27/08; B32B 27/22; B32B 27/304; B32B 2266/025; B32B 2307/102; B32B 2307/412; B32B 2307/546; B32B 2307/72; B32B 2451/00; B32B 2471/00;
 (Continued)

(56) References Cited

U.S. PATENT DOCUMENTS

| 5,910,358 A | 6/1999 | Thoen et al. |
| 8,707,646 B2 * | 4/2014 | Keane .................. E04F 15/203 52/403.1 |
| 2015/0375471 A1 * | 12/2015 | Song ................... E04F 15/105 428/159 |

FOREIGN PATENT DOCUMENTS

| EP | 3495136 | 6/2019 |
| EP | 3505342 | 7/2019 |

OTHER PUBLICATIONS

Rapport de Recherche Preliminaire et Opinion Ecrite [Preliminary Search Report and Written Opinion] dated Feb. 24, 2020 From the Institut National de la Propriete Industrielle, INPI, Republique Francaise Re. Application No. FR 1910043. (6 Pages).

* cited by examiner

*Primary Examiner* — Catherine A. Simone

(57) ABSTRACT

A multi-layered structure (1) for the production of a floor or wall covering. The structure comprises:
  a first assembly (E) successively comprising at least:
  a transparent wear layer (E1) made of polyvinyl chloride;
  a decorative layer (E2) bonded to the wear layer (E1);
  a backing layer (E3), bonded to the decorative layer (E2), produced from plasticized and loaded polyvinyl chloride;
  a foam layer (2), bonded to the backing layer (E3), imparting sound-insulating properties to the structure, and having a lower side. The first assembly (E) comprises a tensile modulus for 1% elongation greater than 5 MPa, and a flexural modulus at 3.5% between 10 MPa and 20 MPa and the foam layer (2) is a cross-linked polyolefin foam layer, having a thickness between 0.5 mm and 2 mm, and a density between 60 $kg/m^3$ and 120 $kg/m^3$.

11 Claims, 1 Drawing Sheet

(51) Int. Cl.
*B32B 27/08* (2006.01)
*B32B 27/22* (2006.01)
*B32B 27/30* (2006.01)
*E04B 1/86* (2006.01)
*E04F 13/08* (2006.01)
*E04F 13/18* (2006.01)
*E04F 15/10* (2006.01)
*E04B 1/84* (2006.01)
*E04F 15/02* (2006.01)

(52) U.S. Cl.
CPC .............. *B32B 27/304* (2013.01); *E04B 1/86* (2013.01); *E04F 13/0866* (2013.01); *E04F 13/0875* (2013.01); *E04F 13/18* (2013.01); *E04F 15/105* (2013.01); *E04F 15/107* (2013.01); *B32B 2266/025* (2013.01); *B32B 2307/102* (2013.01); *B32B 2307/412* (2013.01); *B32B 2307/546* (2013.01); *B32B 2307/72* (2013.01); *B32B 2451/00* (2013.01); *B32B 2471/00* (2013.01); *B32B 2607/02* (2013.01); *E04B 2001/8461* (2013.01); *E04F 13/0885* (2013.01); *E04F 15/0215* (2013.01)

(58) Field of Classification Search
CPC ................... B32B 2607/02; E04B 1/86; E04B 2001/8461; E04F 13/0866; E04F 13/0875; E04F 13/18; E04F 13/0885; E04F 15/0215; E04F 15/105; E04F 15/107
See application file for complete search history.

[Fig. 1]
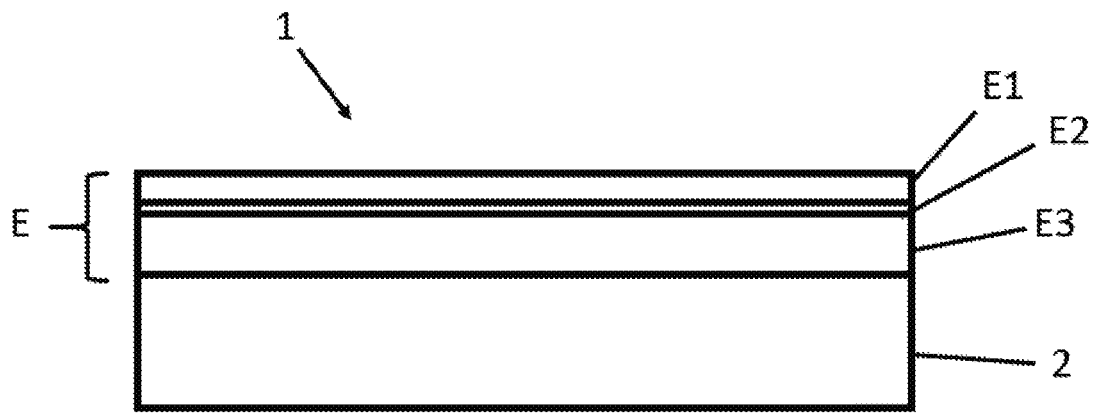
[Fig. 2]
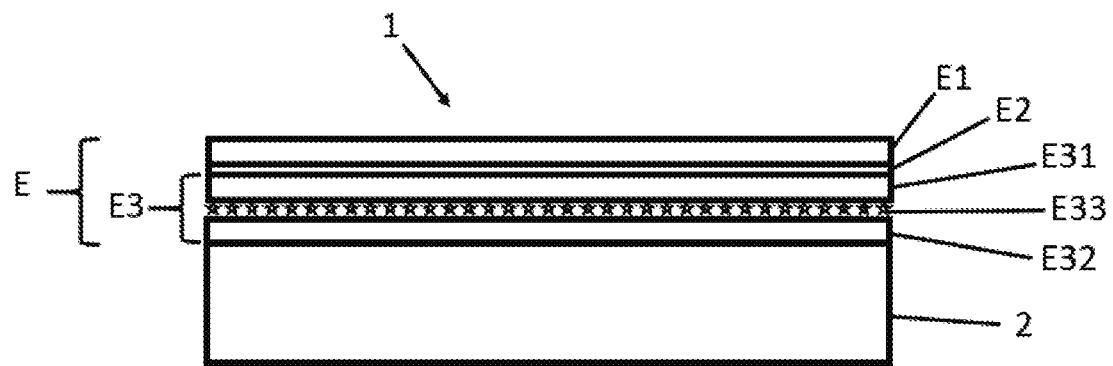

MULTI-LAYERED STRUCTURE FOR THE PRODUCTION OF A FLOOR COVERING WITH SOUND-INSULATING AND INDENTATION-RESISTANT PROPERTIES

RELATED APPLICATION

This application claims the benefit of priority of French Patent Application No. 1910043 filed on Sep. 12, 2019, the contents of which are incorporated herein by reference in their entirety.

FIELD AND BACKGROUND OF THE INVENTION

The present invention relates to the technical sector of floor or wall coverings, and in particular relates to a multi-layered structure for the production of a floor or wall covering having sound-insulating and indentation-resistant properties.

The multi-layered structure according to the invention relates to floor coverings with slabs or strips, with glue-down or potentially loose lay installation.

PRIOR ART

It is well-known in the state of the art to produce multi-layered structures for the production of a floor or wall covering, having sound-insulating properties.

Indeed, noise pollution has become a major societal issue. Many stakeholders in the floor covering market propose multi-layered structures comprising layers of foam and sound insulation incorporated into the multi-layered structure, or applied, for example, in rolls.

In general, in the prior art, a multi-layered structure for the production of a floor or wall covering comprises:
 a first assembly successively comprising at least:
 a transparent wear layer made of polyvinyl chloride;
 a decorative layer bonded to the wear layer;
 a backing layer, bonded to the decorative layer, made of plasticized and loaded polyvinyl chloride;
 a cross-linked polyethylene foam layer, bonded to the backing layer, imparting sound-insulating properties to the structure, and having a lower face intended to be in contact with the floor or wall.

Increased thickness of the foam layer improves sound attenuation, however this degrades the floor covering's resistance to remanent indentation. The products in the market cannot guarantee attenuation of at least 18 dB, or even 19 dB in accordance with NF EN ISO 717-2 standard, while maintaining a remanent indentation resistance value less than 0.25.

Furthermore, when the foam layer is applied, this creates an inconvenient two-step laying process, first the foam layer is glued down, then the slabs are glued onto said foam layer, which makes the laying process more complicated and longer.

SUMMARY OF THE INVENTION

One of the aims of the invention is therefore to resolve the aforementioned inconveniences by proposing a multi-layered structure for the production of a floor or wall covering, which enables sound attenuation of at least 18 dB in accordance with the NF EN ISO 717-2 standard, while maintaining a permanent indentation resistance value less than 0.25.

To this end, a multi-layered structure was developed for the production of a floor or wall covering, in accordance with that of the state of the art in that it comprises:
 a first assembly successively comprising at least:
 a transparent wear layer made of polyvinyl chloride;
 a decorative layer bonded to the wear layer;
 a backing layer, bonded to the decorative layer, made of plasticized and loaded polyvinyl chloride;
 a foam layer, bonded to the backing layer, imparting sound-insulating properties to the structure, and having a lower face intended to be in contact with the floor or wall.

According to the invention:
 the first assembly comprises a tensile modulus for 1% elongation greater than 5 MPa, for example measured according to the M.1 "determination of toughness" method given by the QB 30 standard from the Scientific and Technical Center for Building (CSTB), and a 3.5% flexural modulus between 10 MPa and 20 MPa, measured according to the ISO 178:2019 standard;
 the foam layer is a cross-linked polyolefin foam layer, having a thickness between 0.5 mm and 2 mm, and a density between 60 kg/m$^3$ and 120 kg/m$^3$.

In accordance with the foregoing, the mechanical characteristics of the first assembly and the foam layer are optimized and make it possible to achieve the objective of the invention, and in particular an attenuation of at least 18 dB in accordance with NF EN ISO 717-2 standard, and a permanent impression during indentation in accordance with ISO 24343-1 standard for 2 h 30 min, less than 0.25, or even less than 0.2 mm.

More specifically, the cross-linked polyolefin foam layer is a cross-linked polyethylene or cross-linked polypropylene foam layer.

The foam layer is cross-linked through irradiation (creation of structural links), this operation makes it possible to improve its properties such as temperature resistance, mechanical resistance to compression, or even moisture resistance. In particular, a cross-linked polyethylene foam makes it possible to obtain a good compromise between mechanical resistance to compression, in particular to withstand the traffic undergone by the floor covering, and the acoustic properties of the floor covering.

Preferably, the foam layer has a thickness between 0.8 mm and 1.2 mm, and a density between 80 kg/m$^3$ and 110 kg/m$^3$. This combination provides a better compromise between acoustic properties and indentation resistance.

Based on this concept, the multi-layered structure can have several configurations.

In general, the multi-layered structure has a thickness between 1.5 mm and 6 mm, and preferably between 1.5 mm and 3 mm.

For example, the wear layer comprises a thickness between 0.3 mm and 1 mm, the decorative layer is a printed PVC film with a thickness between 60 and 110 μm, and the backing layer has a thickness between 1 and 3 mm.

Furthermore, the backing layer may be semi-stiff or reinforced.

In the case where the backing layer is semi-stiff, it comprises an amount of plasticizer between 10 and 30 parts per hundred of resin (PHR), and preferably between 15 and 25 PHR.

In the case where the backing layer is reinforced, it comprises two intermediate layers made of plasticized and loaded polyvinyl chloride, and arranged on either side of a reinforcement frame. The two intermediate layers notably comprise an amount of conventional plasticizer, i.e. between 25 and 50 PHR.

BRIEF DESCRIPTION OF THE SEVERAL VIEWS OF THE DRAWINGS

Other features and advantages will emerge better from the following description, provided as a non-limiting example, in reference to the appended figures, in which:

FIG. 1 is a schematic view in cross-section of a first embodiment of a multi-layered structure according to the invention;

FIG. 2 is a schematic view similar to that of FIG. 1, showing a second embodiment of the invention, with a reinforced backing layer.

DESCRIPTION OF SPECIFIC EMBODIMENTS OF THE INVENTION

In reference to FIGS. 1 and 2, the invention relates to a multi-layered structure (1) for the production of a floor or wall covering, having sound-insulating properties in accordance with the NF EN ISO 717-2 standard, while retaining indentation-resistant properties in accordance with the ISO 24343-1 standard.

In general, the multi-layered structure (1) comprises a first assembly (E), i.e. an upper structure referred to as stiff, to which a layer of foam (2) is bonded imparting sound-insulating properties to the multi-layered structure (1), and having a lower side intended to be in contact with the ground or wall.

The first assembly (E) successively comprising at least:
a transparent wear layer (E1), in particular in visible light, made of polyvinyl chloride;
a decorative layer (E2) bonded to the wear layer (E1);
a backing layer (E3), bonded to the decorative layer (E2), made of plasticized and loaded polyvinyl chloride;

In this type of multi-layered structure (1) the layers are bonded to each other by gluing, hot lamination, or any other suitable technique well known to persons skilled in the art. This type of multi-layered structure (1) has slabs or strips, and is generally used with glue-down installation. Of course, it is possible to use loose lay installation with a groove/tongue assembly system or equivalent, and wherein the first assembly (E), excluding the foam layer (2), has a thickness greater than 4 mm.

The foam layer (2) is a cross-linked polyolefin foam layer, for example in particular cross-linked polyethylene or polypropylene foam, and has a thickness between 0.5 and 2 mm, or even between 0.8 mm and 1.2 mm, and a density between 60 kg/m$^3$ and 120 kg/m$^3$, or even between 80 kg/m$^3$ and 110 kg/m$^3$.

In order to optimize the performance of indentation resistance, the first assembly (E) comprises a tensile modulus for 1% elongation greater than 5 MPa, for example measured according to the M.1 "determination of toughness" method given by the QB 30 standard of the CSTB. In other words, it is necessary to exert traction with a force greater than 5 MPa, on either side of a sample of the structure, to try to elongate it by at least 1% of its length.

According to the M.1 "determination of toughness" method given by the QB 30 standard of the CSTB, a material has a greater toughness when the stress needed to cause a determined elongation (1% for example) is high. The "Tensile modulus for 1% elongation" corresponds to the linear stress (applied to the width of the test piece) which causes an elongation of 1%.

The method to determine the tensile modulus for 1% elongation comprises the following steps:

To determine the elongation characteristics of the material, the elongation/load curve is plotted under defined conditions of test-piece dimensions and strain rate, then the stress causing a 1% elongation is measured, this being equal to the tensile modulus for 1% elongation.

The test pieces are stored at a temperature of 23°+/−2° C. at a relative humidity of 50%+/−5% for at least 24 hours before the test. The samples must come from batches which have not undergone any treatment (cleaning or other product) since they were produced.

The equipment consists of a tensile testing machine with a recording device enabling the elongation of the test piece to be multiplied by at least two and of which each centimeter of the load scale is no more than 3 daN, Initial distance between jaws: 250+/−1 mm, separation rate: 50+/−2 mm/min, strain rate: 20%/min.

Twelve test pieces are taken from each sample (six for the initial test and six others to perform a retest if necessary). Six test pieces must be cut in the machine direction and the other six in the transverse direction.

The test pieces have a minimum length of 300 mm and a width of 50+/−1 mm.

Two marks are made using a marker at a distance of 250 mm from the two ends of the test piece.

Operating Mode:
The load scale used and the "paper speed/movable jaw speed" ratio are checked.
The test piece is placed between the jaws, ensuring that it remains straight after tightening.
The dynamometer is started, including the recording device
The test is stopped when an elongation of 5% is reached.
In order to calculate the results, the elongation/load curve and loads corresponding to an elongation of 1% are read and applied to the width of the test piece in N/50 mm with a decimal. The averages of the three obtained results are determined for each direction. The sample is characterized by the lower of the two averages (machine direction or transverse direction). If one of the samples does not meet the specification, three new test pieces are tested for the direction in question; the sample is characterized by the average of the six results.

The first assembly (E) also has a flexural modulus at 3.5% between 10 MPa and 20 MPa, measured according to the ISO 178:2019 standard. In other words, it is necessary to exert a pressing force in the middle of the sample, between 10 MPa and 20 MPa to bend the sample by a deflection equivalent to 3.5% of the length of the sample.

Thus, the combination of the mechanical characteristics of the first assembly (E) and the foam layer (2) are optimized and make it possible to achieve sound attenuation of at least 18 dB in accordance with the NF EN ISO 717-2 standard, while retaining a permanent indentation resistance value less than 0.25 or even less than 0.2.

The multi-layered structure (1) according to the invention has a thickness between 1.5 mm and 6 mm, preferably between 1.5 mm and 3 mm.

For example, the wear layer (E1) comprises a thickness between 0.3 mm and 1 mm, the decorative layer (E2) is a PVC film printed, for example, by rotogravure or digital printing, and has a thickness generally between 50 and 100

μm, more specifically 70 μm, while the backing layer (E3) has a thickness between 1 and 3 mm.

In reference to FIG. 1, the backing layer (E3) may be semi-stiff, i.e., it comprises an amount of plasticizer between 10 and 30 parts per hundred of resin (PHR), and preferably between 15 and 25 PHR.

In reference to FIG. 2, the backing layer (E3) is reinforced, it comprises two intermediate layers (E31, E32) made of plasticized and loaded polyvinyl chloride, and arranged on either side of a reinforcement frame (E33), for example a glass web or glass mesh. The two intermediate layers (E31, E32) in particular comprise an amount of conventional plasticizer, i.e., between 25 and 50 PHR.

In order to validate the sound attenuation and indentation resistance, tests were carried out with a multi-layered structure (1) comprising a first assembly (E) comprising:
- a wear layer (E1) in plasticized PVC with a thickness of 0.5 mm and having a wear resistance≤2 mm³ in accordance with EN 660.2
- a decorative film (E2) printed by rotogravure with a thickness of 70 μm
- a backing layer (E3) of plasticized PVC, with 20 PHR of DINP plasticizer, 200 PHR of calcium carbonate fillers, 14 PHR of calcium stearate processing aids.

The first assembly (E) has a tensile modulus value for 1% elongation of 5.84 MPa, measured according to the M.1 "determination of toughness" method given by the QB 30 standard of the CSTB, and a 3.5% flexural modulus at 13.18 MPa, measured in accordance with the ISO 178:2019 standard.

This first assembly (E) was linked to six different foam layers (2), to carry out six sound tests in accordance with the NF EN ISO 717-2 standard and indentation tests in accordance with the ISO 24343-1 standard.

The test results are provided in the table below:

TABLE 1

| Foam layer | Thickness (mm) | Density (kg · m³) | Sound attenuation dB | Impact sound dB | Indentation 2 h 30 min mm | Results OK/NOK |
|---|---|---|---|---|---|---|
| Cross-linked polyethylene | 1 | 100 | 19 | 69 | 0.18 | OK |
| Cross-linked polyethylene | 1 | 83 | 19 | 69 | 0.23 | OK |
| Cross-linked polyethylene | 1 | 55 | 20 | 68 | 0.32 | NOK |
| Non-cross-linked polyethylene | 1.5 | 75 | 17 | 70 | 0.18 | NOK |
| Cross-linked polypropylene | 1 | 100 | 19 | 69 | 0.23 | OK |
| Polystyrene | 1.5 | 100 | 17 | 70 | 0.28 | NOK |

The results show that a cross-linked polyethylene foam layer (2) whose density is less than 60 kg/m³ degrades the indentation resistance, while those whose density is greater than 60 kg/m³ make it possible to retain high indentation resistance, i.e., less than 0.25. Likewise, a cross-linked polypropylene foam layer (2) whose density is greater than 60 kg/m³ and preferably between 80 and 110 kg/m³ retains high indentation resistance.

A non-cross-linked polyethylene foam layer (2) does not enable obtaining sufficient sound attenuation, even with great thickness.

A polystyrene foam layer (2) flattens under stress and is not sufficiently resilient, which leads to poor indentation results.

As seen above, the invention does indeed provide a multi-layered structure (1) for the production of floor coverings, which has sound-insulating properties, while making it possible to retain high indentation resistance.

What is claimed is:

1. A multi-layered structure for the production of a floor or wall covering, the structure comprising:
   a first assembly successively comprising at least:
      a transparent wear layer made of polyvinyl chloride;
      a decorative layer bonded to the wear layer;
      a backing layer, bonded to the decorative layer, made of plasticized and loaded polyvinyl chloride;
   a foam layer, bonded to the backing layer, imparting sound-insulating properties to the structure, and having a lower face intended to be in contact with the floor or wall;
   wherein:
   the first assembly comprises a tensile modulus for 1% elongation greater than 5 MPa, and a flexural modulus at 3.5% between 10 MPa and 20 MPa, measured in accordance with the ISO 178:2019 standard;
   the foam layer is a cross-linked polyolefin foam layer, having a thickness between 0.5 mm and 2 mm, and a density between 60 kg/m³ and 120 kg/m³.

2. The multi-layered structure according to claim 1, wherein the backing layer comprises an amount of plasticizer between 10 and 30 parts per hundred of resin.

3. The multi-layered structure according to claim 2, wherein the backing layer comprises an amount of plasticizer between 15 and 25 parts per hundred of resin.

4. The multi-layered structure according to claim 1, wherein the backing layer comprises two intermediate layers made of plasticized and loaded polyvinyl chloride, and arranged on either side of a reinforcement frame, the two intermediate layers comprising an amount of plasticizer between 25 and 50 parts per hundred of resin.

5. The multi-layered structure according to claim 1, wherein the thickness of the foam layer is between 0.8 mm and 1.2 mm.

6. The multi-layered structure according to claim 1, wherein the density of the foam layer is between 80 kg/m³ and 110 kg/m³.

7. The multi-layered structure according to claim 1, wherein the cross-linked polyolefin foam layer is a cross-linked polyethylene foam layer.

8. The multi-layered structure according to claim 1, wherein the cross-linked polyolefin foam layer is a cross-linked polypropylene foam layer.

9. The multi-layered structure according to claim 1, wherein it has a thickness between 1.5 mm and 6 mm.

10. The multi-layered structure according to claim 9, wherein it has a thickness between 1.5 mm and 3 mm.

11. The multi-layered structure according to claim 9, wherein:
- the wear layer comprises a thickness between 0.3 mm and 1 mm;
- the decorative layer is a printed PVC film with a thickness of 70 μm;
- the backing layer has a thickness between 1 and 3 mm.

* * * * *